United States Patent
Chavan

(10) Patent No.: US 11,650,822 B1
(45) Date of Patent: May 16, 2023

(54) PROGRAM FLOW PREDICTION FOR LOOPS

(71) Applicant: Arm Limited, Cambridge (GB)

(72) Inventor: Vijay Chavan, Tempe, AZ (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/509,897

(22) Filed: Oct. 25, 2021

(51) Int. Cl.
*G06F 9/38* (2018.01)
*G06F 9/30* (2018.01)
*G06F 9/32* (2018.01)

(52) U.S. Cl.
CPC ........ *G06F 9/3848* (2013.01); *G06F 9/30065* (2013.01); *G06F 9/325* (2013.01); *G06F 9/3842* (2013.01); *G06F 9/3804* (2013.01)

(58) Field of Classification Search
CPC .. G06F 9/3842; G06F 9/30065; G06F 9/3848; G06F 9/325; G06F 9/3804
See application file for complete search history.

(56) References Cited

U.S. PATENT DOCUMENTS

| | | | | |
|---|---|---|---|---|
| 5,978,909 | A * | 11/1999 | Lempel | G06F 9/3846 712/240 |
| 11,132,200 | B1 * | 9/2021 | Chavan | G06F 9/381 |
| 2019/0310851 | A1 * | 10/2019 | Grocutt | G06F 9/30036 |
| 2020/0050458 | A1 * | 2/2020 | Bouzguarrou | G06F 9/30065 |

* cited by examiner

*Primary Examiner* — Courtney P Carmichael-Moody
(74) *Attorney, Agent, or Firm* — Nixon & Vanderhye P.C.

(57) ABSTRACT

Instruction processing circuitry comprises fetch circuitry to fetch instructions for execution; instruction decoder circuitry to decode fetched instructions; execution circuitry to execute decoded instructions; and program flow prediction circuitry to predict a next instruction to be fetched; in which the instruction decoder circuitry is configured to decode a loop control instruction in respect of a given program loop and to derive information from the loop control instruction for use by the program flow prediction circuitry to predict program flow for one or more iterations of the given program loop.

5 Claims, 3 Drawing Sheets

PROGRAM FLOW PREDICTION FOR LOOPS

BACKGROUND

This disclosure relates to circuitry and methods.

In some data processing applications, so-called program flow prediction is used to predict instances of non-linear program flow, such as the outcome (branch taken or branch not taken) from conditional program flow branching instructions.

In some examples, the branch prediction process operates in the context of a looped operation so as to predict whether a further iteration of a loop is predicted to take place, or whether the loop is predicted to terminate.

The present disclosure concerns potential improvements in such arrangements.

SUMMARY

In an example arrangement there is provided instruction processing circuitry comprising:
fetch circuitry to fetch instructions for execution;
instruction decoder circuitry to decode fetched instructions;
execution circuitry to execute decoded instructions; and
program flow prediction circuitry to predict a next instruction to be fetched;
in which the instruction decoder circuitry is configured to decode a loop control instruction in respect of a given program loop and to derive information from the loop control instruction for use by the program flow prediction circuitry to predict program flow for one or more iterations of the given program loop.

In another example arrangement there is provided a method comprising:
predicting a next instruction to be fetched;
fetching instructions for execution;
decoding fetched instructions; and
executing decoded instructions;
in which the decoding step comprises decoding a loop control instruction in respect of a given program loop and deriving information from the loop control instruction for use by the predicting step to predict program flow for one or more iterations of the given program loop.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Branch Prediction—Overview

Figure 1:
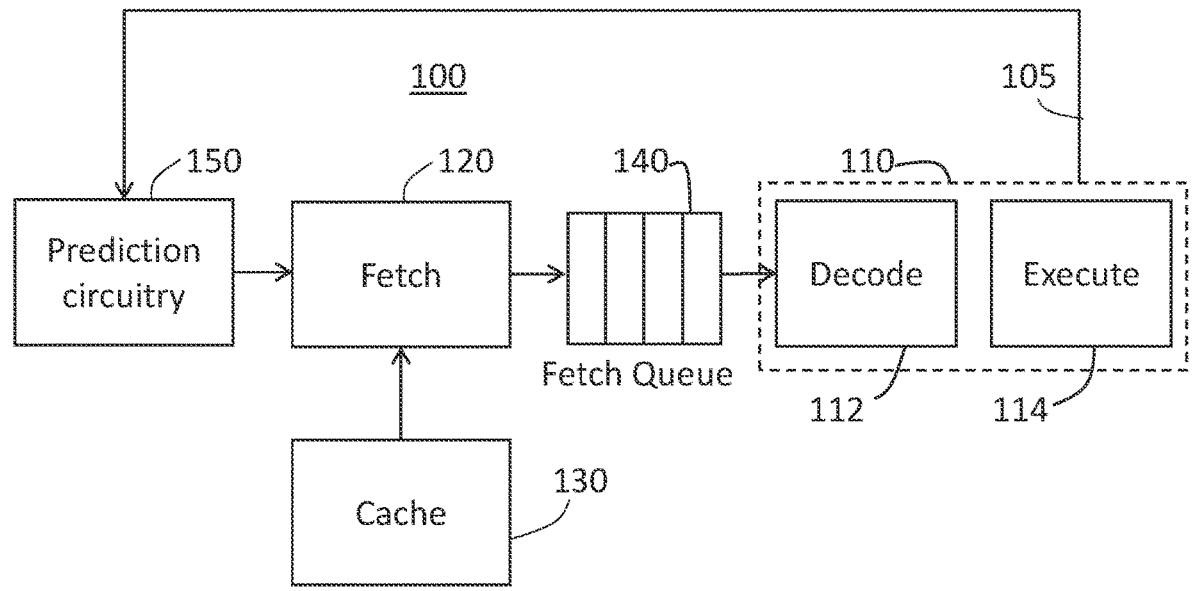
FIG. 1 schematically illustrates an example circuitry.

FIG. 1 is a schematic example of data processing circuitry 100 comprising a processing element (PE) 110 to execute program code instructions and fetch circuitry 120 to fetch instructions for execution (or blocks, containing instructions for execution), from memory (not shown) and/or a cache 130 such as an instruction cache. The fetched instructions or blocks are defined by a fetch queue 140. The data processing circuitry also comprises prediction circuitry 150 to predict one or more next blocks to be fetched and to control operation of the fetch circuitry 120 in response to that prediction.

Therefore, the circuitry of FIG. 1 comprises a fetch queue 140 to store one or more instructions in response to the predicted branch outcome; and fetch circuitry 120 to fetch instructions for execution.

The PE 110 comprises at least instruction decoder circuitry 112 and execution circuitry 114. The data processing circuitry 100 operates in a pipelined manner in this example, with an instruction pipeline comprising at least a fetch stage and a processing stage, with the processing stage as drawn being implemented by an execution pipeline implemented by successive decoding 112 and execution 114 stages.

The prediction circuitry 150 generates a prediction of whether a particular branch instruction will be taken or not taken. Operation of this circuitry will be discussed further below.

The processing element 110 may communicate to the prediction circuitry 150, for example by a control signal 105, whether or not predictions made by the prediction circuitry 150 were correct. In the case of an incorrect or misprediction, the execution pipeline and the fetch queue 140 would need to be flushed.

The processing element 110 executes the fetched program code. Generally speaking, the system aims to fetch program code in advance of its execution, so that processing is not itself held up by a lack of code to be executed. So in this regard the fetching is speculative and is based purely on predictions made by the prediction circuitry. The predictions of branch outcomes will be proved to be either correct or incorrect when the relevant branch instruction is finally executed or resolved. If a prediction is incorrect, it may be that the wrong branch target code has been fetched (or code at a branch target has been fetched but the branch, when resolved, was not in fact taken) and the fetch and execution pipelines have to be flushed, incurring a delay while the correct blocks of program code are fetched for execution.

Many software applications are dominated by branch instructions due to control flow changes in the program. High performance processors that are deeply pipelined require high accuracy in branch prediction. However, there is hardware cost associated with storing the past behavior of branch instructions for use by a history-based branch predictor.

Some digital signal processor (DSP) architectures support so-called "low overhead loop" instructions for potentially improved loop performance by helping reduce loop end branch mispredictions and loop overhead. Some microprocessor architectures such as those following the so-called Arm v8.1-M architecture by Arm Limited add similar instructions.

However, in these cases target storage is still required to benefit from these instructions, whether in a dedicated or general-purpose branch prediction structure. This can be expensive in low to mid-size processors (for example due to component or substrate area cost) especially for applications that are dominated by unique repetitive tasks.

Low Overhead Loops

As mentioned above, there is a potential performance loss or penalty due to branch overheads [compare, branch, pipeline bubble] in a loop. To overcome or alleviate these loop overheads, various different architectures have low overhead loop (also referred as "zero overhead loop" in the context of DSPs) instructions that provide hardware with the expected loop count to predict all or at least most iterations of the loop correctly. A key property of these low overhead loop instructions is that they force software (and in turn, the compilation operation to generate that software) to be more explicit about the loop conditions, which can in turn be used to simplify hardware.

Here is a schematic example template of a so-called low overhead loop:
Loop Start [LS] instruction, loopBodyEnd
<loop setup code>
IoopBodyStart:
<loop body>
Loop End [LE] Instruction, IoopBodyStart
<code after Loop End instruction>
loopBodyEnd:
<LoopFallThrough code>

In this schematic pseudocode representation, arbitrary code portions are represented by < > parentheses. Bold text indicates loop start and end labels.

The loop iteration count (for example generated and encoded to the executable code by a compilation stage) is passed to a Loop Start [LS] instruction. The LS instruction is a branch instruction that resolves to NOT TAKEN (entering the loop body code) if the loop iteration count is non-zero and jumps to loopBodyEnd (as a TAKEN outcome) if the iteration count is zero. The LS instruction serves therefore to establish a loop count, and represents a conditional forward branch.

A Loop End [LE] instruction tracks the iteration count and resolves into NOT TAKEN on the last iteration. So, on the last iteration, program flow proceeds to the LoopFallThrough code. The LE instruction behaves like a conditional branch instruction except that the condition here is a loop iteration value (the branch outcome being TAKEN for loop iteration value >0 and NOT TAKEN for loop iteration value=0).

The loop iteration value is explicitly or implicitly decremented on instruction execution of the LE instruction.

Processors that do not have branch predictors can still use low overhead loops to predict loop iterations. However, in such cases there is always at least one misprediction on the first iteration of every occurrence of the loop since the target address and the iteration count are obtained on execution of first LE instruction.

Processors that have traditional branch predictors can rely on them to predict early iterations of LE instructions, and can use low overhead loop instructions to predict the last iteration LE instruction. However, in a mid-size processor that has a small branch predictor (where the term small implies that a relatively small amount of history data is stored), there may be branch mispredictions due to capacity misses (which is to say, misses because the relevant entries required for accurate prediction do not fit into the small branch predictor) especially in applications that are dominated by branch/loop instructions.

Examples of the present techniques can provide a mechanism which can potentially dynamically determine loop prediction information in the pipeline, potentially without a misprediction, while potentially saving the hardware storage that would otherwise be required for such loop end branch instructions.

For example, processors that do not have traditional branch predictors, this mechanism can help avoid misprediction for the first iteration LE instruction of the low-overhead loops.

Deriving Information from the Loop Instructions

Within the context of the low overhead loop template described above, in compiler generated code (and in a neural network processing examples, most of a family of systems known as so-called CMSIS NN kernels) it is common that the IoopBodyStart label is present directly after LS instruction and loopBodyEnd label is present directly after LE instruction.

The LS instruction in such an arrangement provides information on the IoopBodyStart label and the address of LE instruction. When a low overhead loop is first encountered in the processor pipeline, the LS instruction is decoded to extract the IoopBodyStart [target jump address for LE TAKEN case] and loopBodyEnd [target address for LE NOT-TAKEN case] address. The address of LE instruction is extracted by subtracting the size of LE instruction from the loopBodyEnd address.

Figure 2:
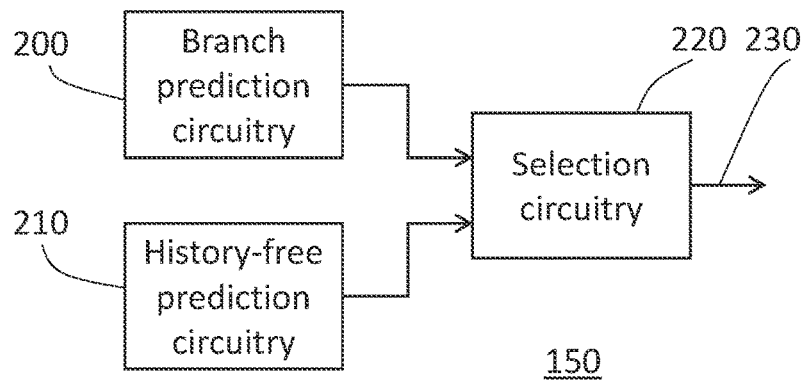
FIG. 2 is a schematic example of program flow prediction circuitry.

As shown schematically in FIG. 2, which is a schematic example of program flow prediction circuitry, the prediction circuitry 150 comprises a branch predictor 200 and a history-free predictor 210. Selection circuitry 220 selects a prediction 230 from either of these two predictors using techniques to be described below.

The branch predictor 200 can be an arbitrary type of branch predictor, such as a history-based predictor.

Figure 3:
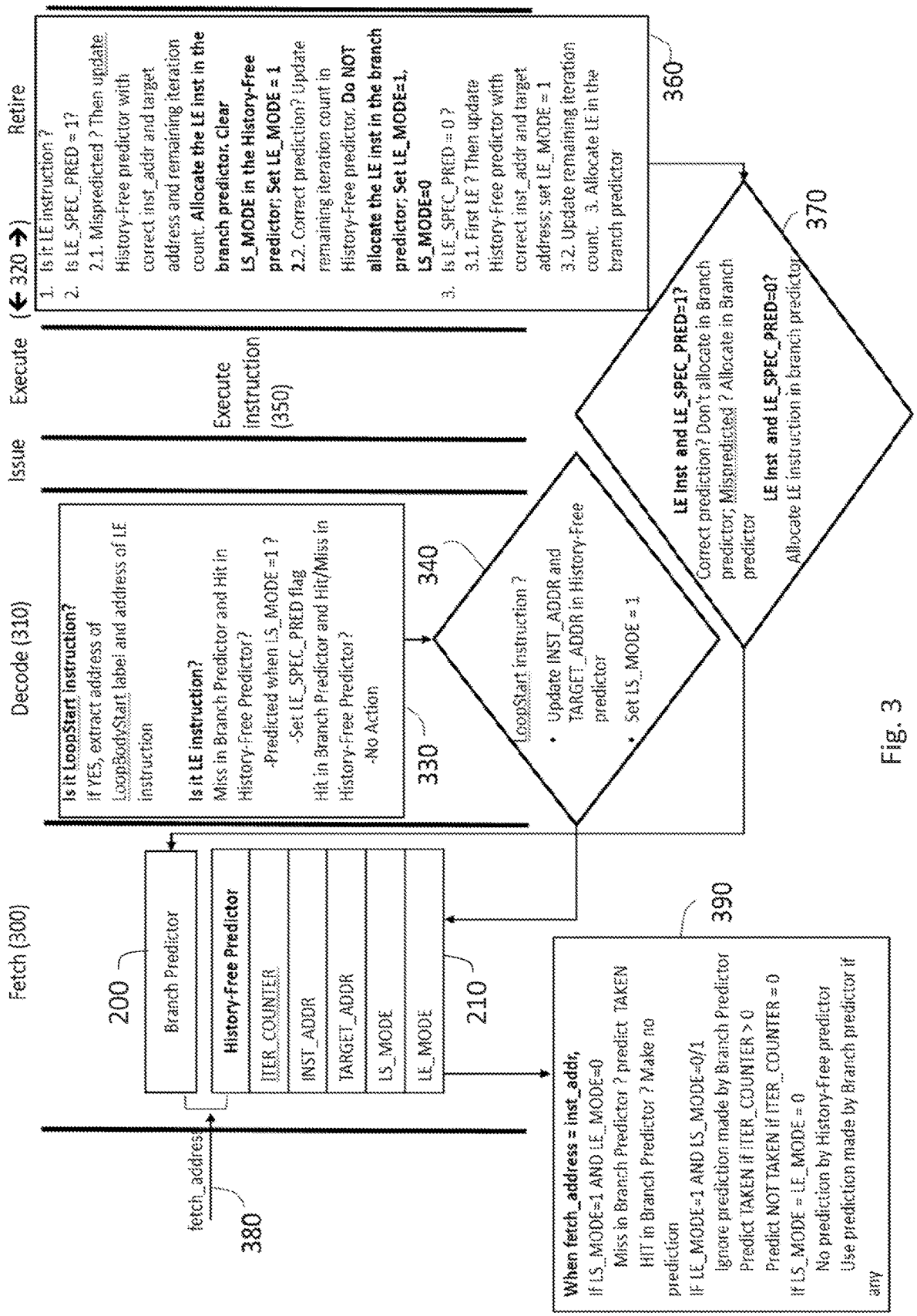
FIG. 3 schematically illustrates operations of a history-free predictor.

FIG. 3 schematically illustrates some prediction techniques. Within the instruction pipeline, fetching is performed by the fetch circuitry 120; decoding by the decode circuitry 112 and issue, execution and retirement by the execution circuitry 114. FIG. 3 represents operations 300 by the fetch/branch prediction stages; operations 310 by the decode circuitry and operations 320 by the execution circuitry as separate respective sections separated by vertical lines as drawn.

The history-free predictor 210 stores various data:
iter_counter—an iteration counter which in this example decrements to zero indicating the end of the loop
instr_addr—a speculative or actual address of an LE instruction
target_addr—a speculative or actual address indicating the IoopBodyStart label
LS_mode indicating that speculative address data is held by the history-free predictor
LE_mode indicating a validated LE address is held by the history-free predictor. When LE_MODE=1, all iter_counter/instr_addr/target_addr are validated data after executing the first LE instruction of the loop Speculative Address Acquisition The history-free predictor is updated with the address of LE instruction [inst_addr] and the address of IoopBodyStart label [target_addr]. Since the address data extracted from the LS instruction is speculative (and is subject to confirmation that the addresses are correct, and therefore indirectly that the assumptions discussed above are correct), set LS_MODE=1 in history-free predictor to identify this situation.

In other words, when LS_MODE=1. the address data by which the history-free predictor is populated is considered speculative because it has been obtained from analysis of the LS instruction using the assumptions discussed above. LS_MODE is cleared (or set to 0) in response to correction of the inst_addr held by the history-free predictor at retirement of an LE instruction (at a step 360 to be discussed below). LS_MODE is also cleared when the correct prediction is made (at step 2.2 of the step 360 to be discussed below).

When a fetch address matches the instruction address in the history-free predictor, the prediction is made using the data extracted from LS instruction [assuming LS_MODE=1].

In the decode stage a 1-bit or other flag (LE_SPEC_PRED) is used to mark the LE instruction if the history-free predictor made the prediction when in LS_MODE and this information flows down the pipeline with the instruction to help identify during execution.

When an LE instruction that was predicted using speculative history-free predictor information [LS_MODE=1] is executed, then assuming the resolution matches the direction and the target address prediction made by history-free predictor, it implies that both the assumptions (that the loopBodyStart label is present directly after the LS instruction and that the loopBodyEnd label is present directly after the LE instruction), are correct and will always hold true for future occurrences of this loop and hence no history tracking of this LE instruction is required. The LE instruction will not be allocated into the branch predictor for history tracking and future predictions, just the iteration counter in history-free predictor is updated with remaining loop iterations. All the future iterations of LE instructions will be predicted only using history-free predictor. However, if there is a misprediction, the history-free predictor is updated with correct inst_addr, target_address and remaining iteration count and the LE instruction will be allocated in the branch predictor so that speculative LE prediction by history-free predictor is not used on this loop in the future. The LS_MODE flag is cleared and LE_MODE (indicating that the history-free predictor contains address information validated by analysis of an LE instruction) is set in this case. The loop iteration count and loop body size are the significant factors here to identify the loop prediction information in time, but the mechanism can determine whether it can get the required information correctly and can decide whether target storage is needed empirically.

The operations to be described with respect to FIG. 3 are represented schematically by flowchart steps which will now be described.

Within the decode circuitry's operations 310, a current instruction is decoded. At step 330, two detections are made.

The first of these detections is whether the current instruction is an LS instruction. If the answer is yes, then the decode circuitry extracts the loopBodyStart label and the address of the LE instruction. Control passes to a step 340 at which the decode circuitry cooperates with the history-free predictor 210 to update the field inst_addr with the address of the LE instruction and to update the field target_addr with the address of the loopBodyStart label.

The second of the detections (noting that the two detections can be made in either order and that if one of the detections has a positive outcome, the other detection does not need to be performed) is whether the current instruction is an LE instruction. Here, two further possibilities are envisaged:

the current address misses in the branch predictor 200 but exhibits a hit in the history-free predictor 210, in which case, if the prediction by history-free predictor 210 was done when LS_MODE=1 on this instruction, the current instruction is tagged with LE_SPEC_PRED (indicating a speculative detection of an LE instruction) flag.
 the current address hits in the branch predictor and either hits or misses in the history-free predictor, in which case no action is taken.

The operations 320 concerned the execution (at a step 350) and retirement (at step 360) of an LE instruction. Regarding the step 360, at retirement of the instruction three tests are performed.

Is it an LE instruction? (If not, the step 360 is aborted and the step 370 to be described below is not performed)
 Does LE_SPEC_PRED=1? If yes, then the step 360 and 370 cooperate so that in the case of a misprediction, the history-free predictor is updated with the correct inst_addr and target_addr and remaining iteration count. The LE instruction is allocated in the branch predictor and LS_MODE is cleared in the history-free predictor. LE_MODE is set to 1. In the case of a correct prediction, the remaining iteration count is updated at the history-free predictor but the LE instruction is not allocated in the branch predictor. However, in this situation LE_MODE is set to 1 and LS_MODE is set to 0.
 Does LE_SPEC_PRED=0? If so then if this is the first LE encountered update the history-free predictor with the correct inst_addr and target_addr. Whether or not it is the first LE, update the remaining iteration count and allocate the LE in the branch predictor. LE_MODE is set to 1.

The iteration counter is initialized at the execution and retirement of the first LE instruction.

Prediction by the History-Free Predictor

The history-free predictor maintains the current iteration count (iter_counter) and so can perform prediction of whether the loop should continue (TAKEN) or should terminate (NOT TAKEN).

The history-free predictor detects that the address of an LE instruction has been reached by using the inst_addr. In terms of the address to predict for TAKEN, this is the target_addr. Both of these may be speculative or confirmed.

Regarding the operation of the history-free predictor, in response to a fetch address 380 (representing the prevailing program counter) provided to the branch predictor and the history-free predictor, the history-free predictor performs a step 390 when the fetch address is the same as the prevailing stored inst_addr and the use or non-use of the prediction made is controlled as follows by the section circuitry 220:

if LS_MODE=1 and LE_MODE=0 (the addresses populated in the history-free predictor are speculative and information has not yet been extracted from an LE instruction) then if there is a miss in the branch predictor, the history-free predictor predicts TAKEN. If there is a hit in the branch predictor than the history-free predictor makes no prediction
 if LE_MODE=1 and LS_MODE=0 or 1 (information has been extracted from an LE instruction), then ignore the prediction made by the branch predictor. Predict TAKEN if iter_counter >0 or predict NOT TAKEN if iter_counter=0
 If LS_MODE=LE_MODE=0, then the history-free predictor does not make a prediction and the prediction made by the branch predictor (if any) should be used. Here note that LS_MODE is set to 0 at the step 360 (portion 2.2). The state LS_MODE=LE_MODE=0 is a default state in the history-free predictor and will be reset to this state on flush due to any non LE branch misprediction.

Updating the History-Free Predictor

A history-free predictor update (steps 340, 360) is triggered by any of the following events: (a) prediction of an LE instruction by history-free predictor at front of the pipeline;

(b) decoding of an LS instruction by the decode circuitry; or
(c) execution/retirement of an LE instruction at the back of the pipeline.

Reserve Use of the Branch Predictor 200

The branch predictor 200 can be useful in situations in which the assumptions are in fact incorrect that LoopBodyStart is directly after an LS instruction and LoopBodyEnd is present after an LE instruction. In these situations, the traditional branch predictor is used to predict early iterations of the loop and the history-free predictor is used to predict a last iteration. For loops having a small number of iterations and/or loops with a relatively short loop body, it could potentially be difficult for the history-free predictor to dynamically obtain the loop prediction information in time for its use, but such loops would be easily tracked by traditional branch predictors.

Examples not Using a Branch Predictor 200

In the case that the circuitry does not have a traditional branch predictor such as the branch predictor 200, the present mechanism can still be used to avoid or at least alleviate first iteration mispredictions. In this case there is no additional penalty if the prediction by history-free predictor is wrong since there would have been a misprediction on first iteration anyway due to lack of traditional branch predictor.

SUMMARY

Examples of this mechanism of dynamically determining prediction information of Loop End instructions in the low over-head loops using a dedicated history-free predictor can potentially reduce branch mispredictions without necessarily incurring any target storage cost. For processors which have traditional branch predictor this will allow the tracking of more branches and potentially reduce the penalty of losing branch history due to capacity misses (because branches predicted using these techniques by the history-free predictor will not require storage by a conventional branch predictor). For processors that do not have traditional branch predictors, this mechanism can potentially help avoid misprediction for the first iteration LE instruction of low-overhead loops.

The apparatus of FIGS. 1 and 2, operating in accordance with the techniques described above, provides an example of instruction processing circuitry comprising:

fetch circuitry 120, 140 to fetch instructions for execution;

instruction decoder circuitry 112 to decode fetched instructions;

execution circuitry 114 to execute decoded instructions; and program flow prediction circuitry 150 to predict a next instruction to be fetched;

in which the instruction decoder circuitry is configured to decode a loop control instruction in respect of a given program loop and to derive information (such as inst_addr, target_addr) from the loop control instruction for use by the program flow prediction circuitry to predict program flow for one or more iterations of the given program loop.

Method Example

Figure 4:
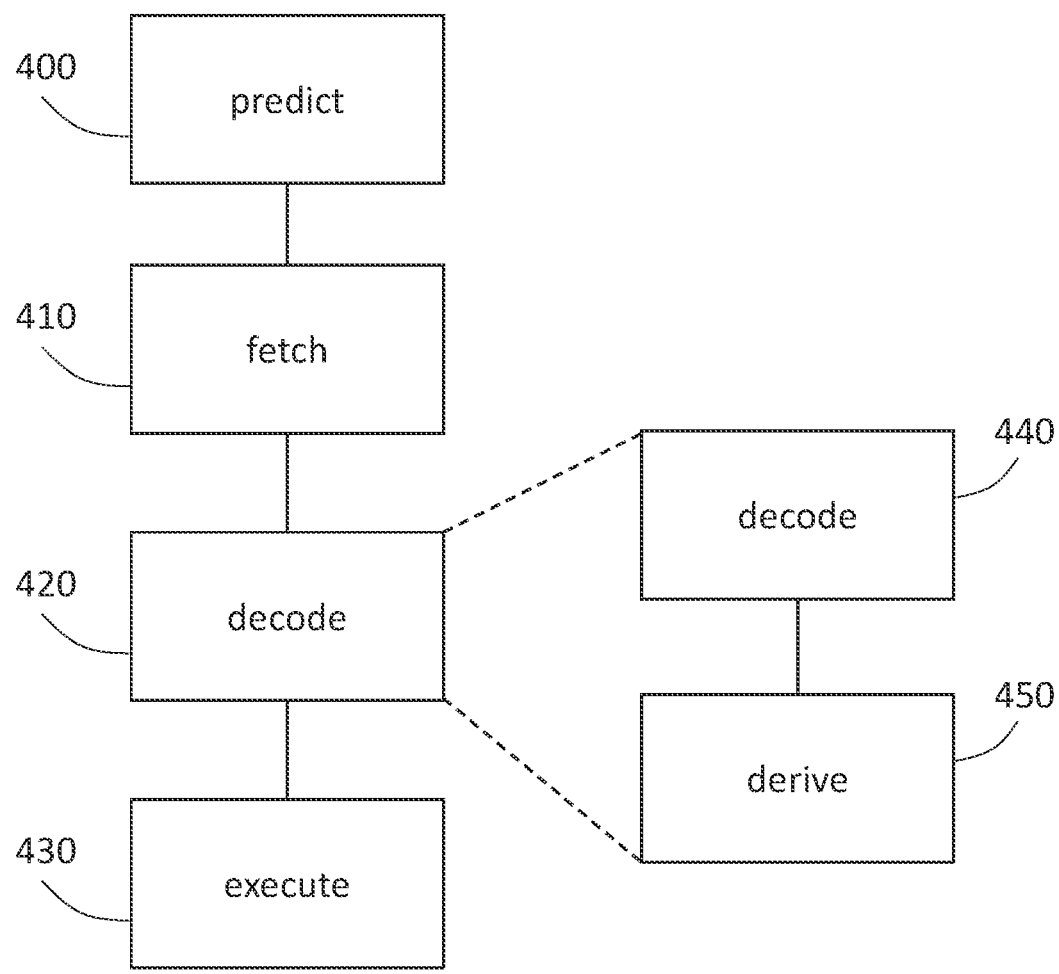
FIG. 4 is a schematic flowchart illustrating a method.

FIG. 4 is a schematic flowchart illustrating a method comprising:

predicting (at a step 400) a next instruction to be fetched;
fetching (at a step 410) instructions for execution;
decoding (at a step 420) fetched instructions; and
executing (at a step 430) decoded instructions;

in which the decoding step comprises decoding (at a step 440) a loop control instruction in respect of a given program loop and deriving (at a step 450) information from the loop control instruction for use by the predicting step to predict program flow for one or more iterations of the given program loop.

General Matters

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. Instruction processing circuitry comprising:
fetch circuitry to fetch instructions for execution;
instruction decoder circuitry to decode fetched instructions;
execution circuitry to execute decoded instructions; and
program flow prediction circuitry to predict a next instruction to be fetched;
in which the instruction decoder circuitry is configured to decode a loop start instruction in respect of a given program loop and to derive information from the loop start instruction for use by the program flow prediction circuitry to predict program flow for one or more iterations of the given program loop;
wherein the information comprises one or both of:
(i) an address of a loop end instruction; and
(ii) a start address of a set of one or more loop body instructions for execution as an iteration of the given program loop;
wherein the program flow prediction circuitry is configured to:
flag the information derived from the loop start instruction as speculative information;
confirm the information in response to decoding a loop end instruction; and
in response to the confirmation, to flag the information as incorrect or as correct and non-speculative.

2. The instruction processing circuitry of claim 1, comprising further branch prediction circuitry to predict branch instruction outcomes using data indicative of previously executed branch instructions.

3. The instruction processing circuitry of claim 2, in which, when the information derived from the loop start instruction is flagged as speculative information and the further branch prediction circuitry predicts a branch outcome, the program flow prediction circuitry is configured not to predict a next instruction to be fetched.

4. The instruction processing circuitry of claim 1, in which the program flow prediction circuitry is configured to maintain a counter of loop iterations and to predict termination of the given program loop after a number of loop operations derived from the loop start instruction.

5. A method comprising:
predicting a next instruction to be fetched;
fetching instructions for execution;
decoding fetched instructions; and
executing decoded instructions;
in which the decoding comprises decoding a loop start instruction in respect of a given program loop and deriving information from the loop start instruction for use by the predicting to predict program flow for one or more iterations of the given program loop;
flagging the information derived from the loop start instruction as speculative information;
confirming the information in response to decoding a loop end instruction; and
in response to the confirming, flagging the information as incorrect or as correct and non-speculative;
wherein the information comprises one or both of:
(i) an address of a loop end instruction; and
(ii) a start address of a set of one or more loop body instructions for execution as an iteration of the given program loop.

* * * * *